Dec. 13, 1960     J. S. BURTON     2,964,002
INFLATOR DEVICE

Filed May 8, 1957     4 Sheets-Sheet 1

INVENTOR
JOHN SPIERS BURTON

By Cushman, Darby & Cushman
ATTORNEYS

Dec. 13, 1960 J. S. BURTON 2,964,002
INFLATOR DEVICE

Filed May 8, 1957 4 Sheets-Sheet 2

INVENTOR
JOHN SPIERS BURTON

BY Cushman, Darby & Cushman
ATTORNEYS

Dec. 13, 1960   J. S. BURTON   2,964,002
INFLATOR DEVICE

Filed May 8, 1957   4 Sheets-Sheet 4

INVENTOR
JOHN SPIERS BURTON

By Cushman, Darby & Cushman
ATTORNEYS

United States Patent Office 2,964,002
Patented Dec. 13, 1960

2,964,002

INFLATOR DEVICE

John Spiers Burton, Birmingham, England, assignor to Imperial Chemical Industries Limited, London, England, a corporation of Great Britain Filed May 8, 1957, Ser. No. 657,899

Claims priority, application Great Britain May 15, 1956

7 Claims. (Cl. 113—44)

This invention relates to inflator devices and is particularly concerned with an inflator device which may be employed for applying hydraulic pressure to an orifice in a metal sheet in order to produce passages of a predetermined design in the sheet.

In the manufacture of sheet metal panels with internal passages for use as evaporators in refrigerators, one important method of production involves printing on the surface of one of two sheets to be welded together a pattern, corresponding to the design of the system of passages required, of a material which will effectively prevent local welding of the two surfaces during the welding operation. After the welding operation the edge portions of the welded sheets are prised apart in the region where the pattern of stop-weld material begins to form an orifice and hydraulic pressure is applied to the orifice to separate, by inflation, the two metal surfaces at the unwelded areas thereof to form passages.

In an alternative process of manufacturing sheet metal panels with internal passages rods of stop-weld material are cast longitudinally into a metal billet and the product is rolled in the longitudinal direction to the strip or sheet, the said rods being crushed in the rolling operation. The areas defined by the powdered stop-weld material are thereafter inflated or expanded by means of hydraulic pressure to form passages.

It is an object of the invention to provide a hydraulic inflator device which will simplify the above-mentioned inflating operations and permit refrigerator evaporators and similar heat exchange units to be produced at relatively high speed.

According to the present invention, an inflator device comprises means for gripping a member to be inflated, a liquid supply nozzle, an inlet for liquid communicating with the said nozzle, means for advancing the liquid-supply nozzle into an orifice in the member and sealing means for maintaining fluid-tight union between the nozzle and the member.

Where the inflator device is to be employed for the inflation of passages in a sheet having a pattern of stop weld material therein, the sheet may be located between platens spaced apart so as to limit the expansion of the passages to the appropriate dimensions. Advantageously, stop means may be provided in the device for locating the side of the sheet in which the orifice is disposed outwardly beyond the sides of the platens to facilitate efficient functioning of the sealing means during the inflating operation as hereinafter described. Such a stop means for locating the sheet is disposed in the apparatus at such a position that the sheet projects a suitable distance out of the gripping means, for example, about 1/32 inch.

The liquid supply nozzle, which is preferably in the form of a hollow needle, is supported in the apparatus in a nozzle holder, which is provided with a recessed forward portion for receiving the sealing means. Conveniently, the sealing means is a resilient ring tightly fitting about the needle.

In use the needle is inserted in the orifice in the sheet and the device is positioned so that the resilient ring overlaps the edges on the side of the sheet and seals tightly against the sides of the means for gripping the sheet.

To improve the functioning of the seal at higher liquid pressure a projecting portion is provided in the recess in the nozzle holder adapted to abut the sealing ring whereby to concentrate the available sealing pressure. The projecting portion in the recess in the nozzle holder is designed to prevent high pressure liquid being forced around the interior faces of the hydraulic seal seated in the recess. It may be annular in shape, surrounding the needle and having an axis co-linear with that of the needle, thereby dividing the recess into two concentric annular spaces, an inner space in which liquid may enter by seepage along the outer surface of the needle, and an outer space virtually sealed off by the annular projection in between, which beds tightly into the sealing ring. The sealing ring is, therefore, compressed by the reactive force of the platens on one side and the compressive force of the annular projection on the other and the arrangement described permits liquid at very high pressure to be used, for example, at 3,000 p.s.i.

The means for gripping the sheets may comprise a pair of spring grips adapted to be inserted between the platens and to be actuated by the platens as they close about the sheet.

In combination with the apparatus of the present invention auxiliary means may be provided to actuate the grips to grip the sheets again after the platens have been opened and thereby to facilitate removal of the inflated sheet from between the platens.

A specific embodiment of the invention is illustrated in the accompanying drawings, and will now be described with reference thereto:

Figure 1:
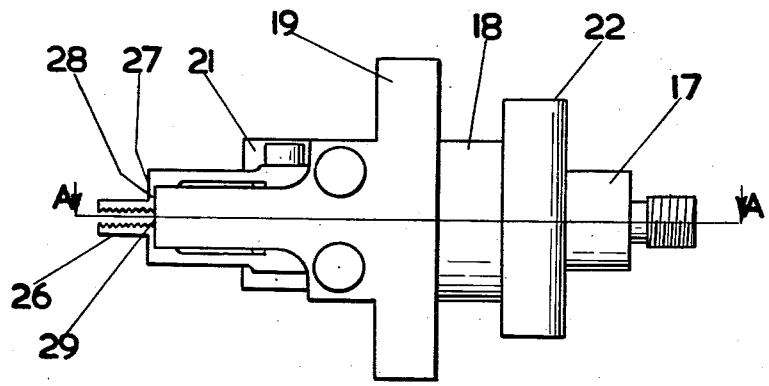
Figure 1 is a side elevation of the inflator.
Figure 2:
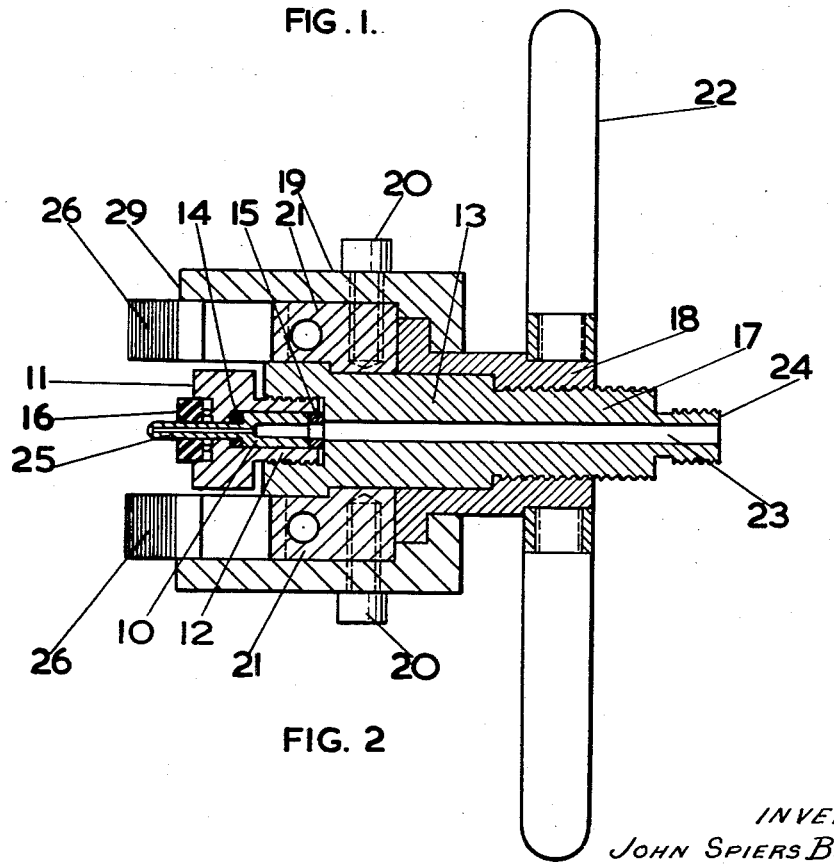
Figure 2 is a sectional plan view of the device of Figure 1 on the centre line 2—2.
Figure 3:
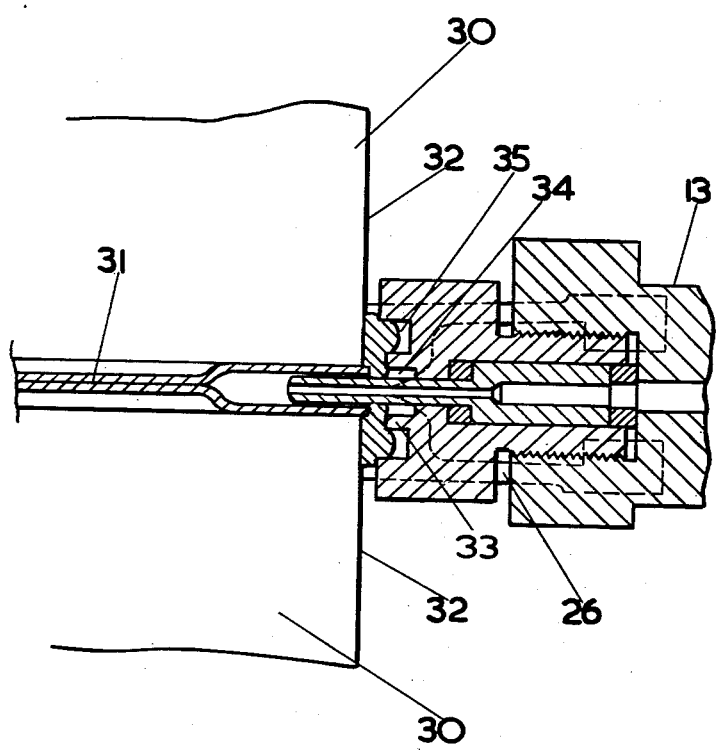
Figure 3 is an enlarged diagrammatic illustration of the position of parts of the device in the inflating operation.

Referring to Figures 1, 2 and 3, the inflator device comprises a nozzle in the form of a needle 10 located in the hollow interior of a needle holder 11, the latter having a reduced portion 12 threaded externally and threadedly mounted in the threaded hollow front portion of a sliding body member 13. The needle 10 is secured tightly in the needle holder 11 by means of washers 14 and 15. Surrounding the leading part of the needle 10 is a hydraulic seal 16 of rubbery material partly located in a recessed portion in the front of the needle holder 11. From the floor of the recess in the needle holder 11 projects an annular portion 33 (see Figure 3) separating the recess into two annular spaces 34 and 35 concentric with one another. The sliding body member 13 has a reduced portion 17 externally threaded and threadedly engaged with the threaded part of the hollow interior of a large nut 18 secured in a nut holder 19. The nut holder 19 is secured by bolts 20 to a grip support member 21. The arrangement is such that by rotation of the large nut 18, achieved by means of a key 22 affixed thereto, the sliding body member 13 slides forward axially through the nut 18 and grip support member 21. The needle holder 11 being engaged with the member 13, the needle 10 is thereby caused to advance in likewise manner. The sliding body member 13 has an axial bore 23 extending from its forward recessed portion to its rear end 24, the end 24 being adapted for connection to a source of pressurised liquid. The axial bore 23 communicates with the jet 25 in the needle 10 for the passage of liquid therebetween. Held by the grip support 21 are a pair of grips 26 of spring steel. The grips 26 have shoulders at 27 for engagement with the sides of platens 30 between which sheets 31 are located during the inflating operation. The platens limit the degree of inflation of the sheet. A clearance at 28 is provided between the leading vertical face 29 of the nut holder 19 and the shoulder 27 on both sides of the apparatus, the vertical face 29 functioning as a stop to locate the edges of the sheets externally of the platen 30 during the inflating operation.

Before using the apparatus, the nut holder 11 is screwed up into the body member 13 to tighten the fit of the members 14 and 15. The sheet 31 is prised open at the side to produce the orifice at the point where the end of the passage to be produced is located and the sheet 31 is set between the platens 30. The inflating apparatus is brought up to the sheet 31 so that the needle 10 is inserted in the orifice and the sheet sides abut the surface 29 on the nut holder 19. The assembly is then moved so that the sheet 31 enters further in between the platens 30 until the shoulders 27 on the grips 26 come into contact with the sides 32 of the platens. Upon closing the platen 30 to limit the size of the passage being blown the grips 26 tightly clamp the sheet in position. By rotation of the key 22 the needle 10 is advanced and inserted further into the orifice in the sheet formed in the initial prising operation and the hydraulic seal 16 is caused to overlap the outer edges of the sheet and to be compressed between the sheet 31, platen sides 32 and annular projection 33 in the needle holder 11, thereby maintaining a highly efficient seal during the flow of the inflating liquid. After inflation the liquid source is disconnected from the inflator and the platens 30 are opened. The sheet is then gripped at its protruding edge and withdrawn from the press.

Figure 4:
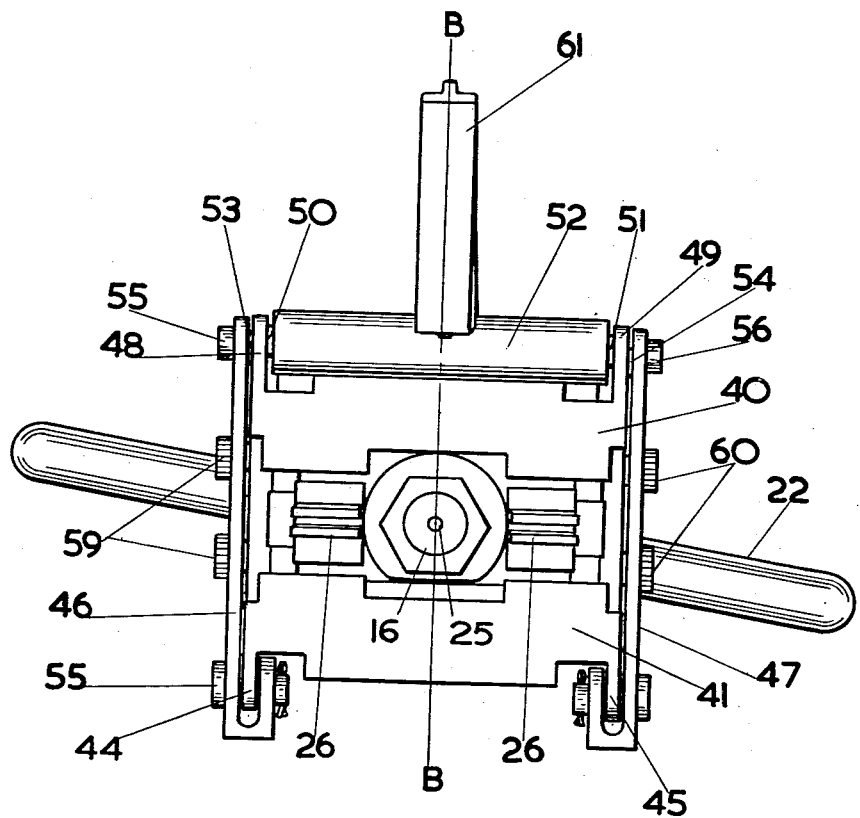
Figure 4 is a front end view of the apparatus and assembled ancillary grip actuating system.
Figure 5:
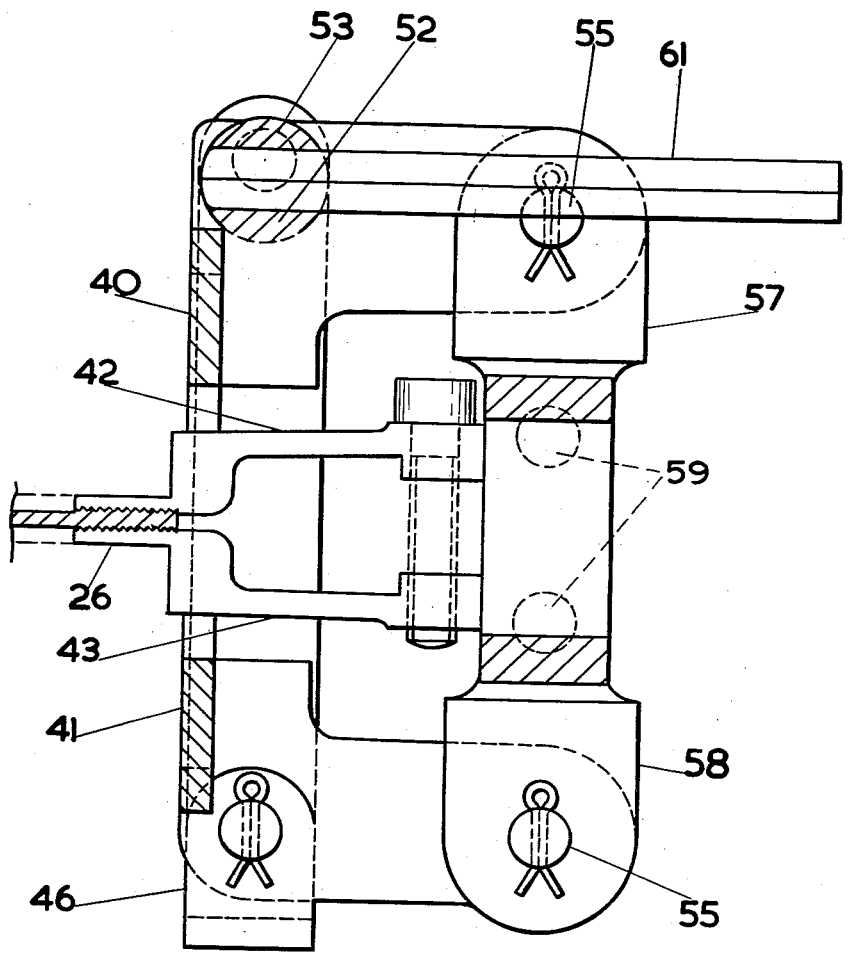
Figure 5 is a vertical section along the line 5—5 of Figure 4, with certain parts omitted for simplicity.

Referring now to Figures 4 and 5, the auxiliary mechanism associated with the inflating apparatus comprises an upper jaw member 40 and lower jaw member 41 adapted to bear upon the surfaces 42, 43 of the upper and lower grips 26 respectively. The lower jaw 41 has extensions 44, 45 pinned to the lower end portions of links 46, 47 respectively. The upper jaw 40 has extensions 48, 49 provided with slots through which extend integral circular cam projections 50, 51 of a cylindrical roller 52. The projections 50, 51 are concentric with the roller 52 and lead at their outer ends to further integral circular cam projections 53, 54 which are eccentric with respect to the roller axis. The eccentric projections 53, 54 extend through slots in the upper end portions of the links 46, 47. The jaws 40, 41 have rearwardly extending portions loosely pinned at 55, 56 to vertically disposed support members 57, 58 which are secured to the nut holder 19 of the inflating apparatus by pins 59, 60. For operating the mechanism a lever 61 is provided rigidly fixed to the roller 52. On moving the lever 61 from the position shown in Figure 4 to that shown in Figure 5 the cam projections 50, 51, 53, 54 operate to cause the jaws 40, 41 to close on the grips and to cause them to bite into a sheet held between them.

At the end of an inflating operation the apparatus is disconnected from the liquid source and the platens 30 are opened releasing the grips 26 from engagement with the sheet 31. The lever 61 is then actuated as described above to re-grip the sheet which is conveniently withdrawn from between the platens.

I claim:

1. An injector device comprising a body member adapted to be connected to a source of hydraulic pressure and having a bore therein for the passage of a liquid to be injected, a liquid supply nozzle, holding means mounting said nozzle in alignment with the bore in said body member for receiving liquid from said bore, gripping means operatively connected to said body member for gripping an article into which liquid is to be injected for inflating such article, means for moving said holding means relative to said gripping means and during normal operation of said injector device to move said nozzle from a retracted to an operative injecting position and vice versa, resilient sealing means mounted on said nozzle and adapted to seal around an aperture in the article into which the nozzle is inserted when its nozzle is in said operative position, said holding means having a forwardly directed projecting portion surrounding said nozzle and spaced therefrom to define therewith a leakage space, said projecting portion having a forward abutment face of substantially smaller area than the cross section of said sealing means and adapted to engage said sealing means in liquid-tight manner when said nozzle is in its operative position thereby substantially to confine in the leakage space any liquid which may escape during the injecting operation.

2. An injector device as defined in claim 1, in which said projecting portion projects from a recessed face of said holding means thereby to define an outer channel in said holding means serving to receive and therefore grip an outer part of said sealing means during the injecting operation.

3. An injector device as defined in claim 2 for use with a press having spaced platens, and comprising first abutment means carried by said body member for engagement with an end face of an article, into which liquid is to be injected to locate the injector device in relation thereto, and second abutment means mounted on said gripping portion for engagement with spaced platens to locate said inflator device in relation to the platens serving to limit the extent of inflation of the article into which liquid is to be injected, said first abutment means being spaced inwardly from said second abutment means whereby an edge portion of the article to be inflated may project outwardly beyond said platens in the liquid injecting operation.

4. An injector device as defined in claim 3 wherein said holding means is connected to said body member for movement therewith, said injecting device further comprising means threadedly engaged to said body member, said last-named means being mounted for rotation in said injector device and operative upon rotation thereof to effect axial sliding movement of said body member and said holding means between the retracted and operative positions thereof, and manually operable means connected to said means threadedly engaged to said body member.

5. An injector device as defined in claim 3, in which the gripping means comprise sprung members biased to remain in spaced relation for insertion therebetween of a sheet member to be inflated, said sprung members being adapted to be engaged by the platen members to close upon and grip said sheet member.

6. Apparatus according to claim 5 and comprising auxiliary means in operative combination with said injector device, said auxiliary means comprising jaw means and means for actuating said jaw means to engage said sprung members and cause said gripping means to grip a sheet located between them.

7. In combination with an injector device as defined in claim 1, a pair of spaced platens designed to mount therebetween the member to be inflated, said injector device further comprising first abutment means carried by said body member for engagement with an end face of the article into which liquid is to be injected to locate the injector device in relation thereto, and second abutment means mounted on said gripping portion for engagement with said spaced platens to locate said injector device in relation to said platens during the liquid injecting operation, said platens limiting the extent of inflation of the article to be inflated, said first and second abutment means being spaced from each other so that an edge portion of the article to be inflated may project outwardly beyond said platens in the inflating operation.

References Cited in the file of this patent

UNITED STATES PATENTS

| | | |
|---|---|---|
| 1,848,307 | Boynton | Mar. 8, 1932 |
| 1,875,330 | Eiseman | Sept. 6, 1932 |
| 2,221,539 | Gehret | Nov. 12, 1940 |
| 2,582,358 | Schoellerman | Jan. 15, 1952 |

FOREIGN PATENTS

| | | |
|---|---|---|
| 22,499 | Great Britain | 1897 |